(12) United States Patent
Sipper et al.

(10) Patent No.: US 9,327,841 B1
(45) Date of Patent: May 3, 2016

(54) EVENT DRIVEN VEHICLE POSITION REPORTING METHODS AND SYSTEMS

(71) Applicant: Lori Talbott, Fairfax, IA (US)

(72) Inventors: Lori J. Sipper, Robins, IA (US);
Madhu S. Niraula, Cedar Rapids, IA (US); Kimm M. Epperson, Springville, IA (US); Curtis W. Talbott, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/275,507

(22) Filed: May 12, 2014

Related U.S. Application Data

(60) Provisional application No. 61/991,252, filed on May 9, 2014.

(51) Int. Cl.
*G08B 21/00* (2006.01)
*B64D 45/00* (2006.01)
*G07C 5/00* (2006.01)
*H04B 7/185* (2006.01)
*G07C 5/08* (2006.01)

(52) U.S. Cl.
CPC .............. *B64D 45/00* (2013.01); *G07C 5/008* (2013.01); *G07C 5/0841* (2013.01); *H04B 7/18508* (2013.01)

(58) Field of Classification Search
CPC ... G07C 5/008; G07C 5/0841; H04B 7/18508
USPC .............................................. 340/945; 701/14
See application file for complete search history.

(56) References Cited

U.S. PATENT DOCUMENTS

| | | | | |
|---|---|---|---|---|
| 6,385,513 | B1* | 5/2002 | Murray et al. | 701/14 |
| 8,665,121 | B2* | 3/2014 | Shavit | 340/945 |
| 2011/0125348 | A1* | 5/2011 | Sandell et al. | 701/14 |

* cited by examiner

*Primary Examiner* — John A Tweel, Jr.
(74) *Attorney, Agent, or Firm* — Angel N. Gerdzhikov; Donna P. Suchy; Daniel M. Barbieri

(57) ABSTRACT

Methods and systems for providing event driven vehicle position reporting are disclosed. For example, if a conventional communication system normally utilized by the vehicle for position reporting is turned off, behaving abnormally or otherwise disabled, methods and systems in accordance with the present disclosure may provide supplemental means and capabilities to continue vehicle position reporting. Furthermore, in certain embodiments, the supplemental reporting systems are configured so that they cannot be turned off or disabled.

18 Claims, 2 Drawing Sheets

EVENT DRIVEN VEHICLE POSITION REPORTING METHODS AND SYSTEMS

CROSS-REFERENCE TO RELATED APPLICATIONS

The present application claims the benefit under 35 U.S.C. §119(e) of U.S. Provisional Application Ser. No. 61/991,252, filed May 9, 2014. Said U.S. Provisional Application Ser. No. 61/991,252 is hereby incorporated by reference in its entirety.

TECHNICAL FIELD

The present disclosure relates generally to communication systems, and more particularly to position reporting communication systems onboard vehicles.

BACKGROUND

Vehicles such as aircrafts, boats and the like utilize various types of communication systems for transmission of messages. Some of the messages being transmitted may include information related to the position, altitude, speed and/or flight path of such a vehicle. However, it is noted that existing communication systems available on such vehicles can be turned off or otherwise disabled to prevent transmission of such information.

SUMMARY

The present disclosure is directed to a vehicle position reporting system. The system includes an event monitor configured to monitor an operating condition of at least one device located on the vehicle and to detect an occurrence of a triggering event. The system also includes a reporting module. The reporting module is configured to send a position report from the vehicle to at least one external equipment when the reporting module is activated, wherein the reporting module is activated by the event monitor when the occurrence of the triggering event is detected.

Another embodiment of the present disclosure is also directed to a vehicle position reporting system. The system includes an event monitor configured to monitor an operating condition of at least an aircraft communications addressing and reporting system located on the vehicle and to detect an occurrence of a triggering event. The system also includes a reporting module. The reporting module is configured to send a position report from the vehicle to at least one external equipment when the reporting module is activated by the event monitor when the triggering event is detected. The reporting module is further configured to implement a backup aircraft communications addressing and reporting system, wherein the backup aircraft communications addressing and reporting system is activated after lapse of a predetermined amount of time since the occurrence of the triggering event is detected.

A further embodiment of the present disclosure is directed to an event driven vehicle position reporting method. The method includes: monitoring an operating condition of at least one device located on a vehicle; detecting an occurrence of a triggering event; and activating a reporting module to report a position of the vehicle to at least one external equipment when the occurrence of the triggering event is detected.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION

Reference will now be made in detail to exemplary embodiments of the disclosure, examples of which are illustrated in the accompanying drawings.

The present disclosure is directed to methods and systems for providing vehicle position reporting when certain events are detected. For example, if a conventional communication system normally utilized by the vehicle for position reporting is turned off, behaving abnormally or otherwise disabled, methods and systems in accordance with the present disclosure may provide supplemental means and capabilities to continue vehicle position reporting. Furthermore, in certain embodiments, the supplemental reporting systems are configured so that they cannot be turned off or disabled.

Figure 1:
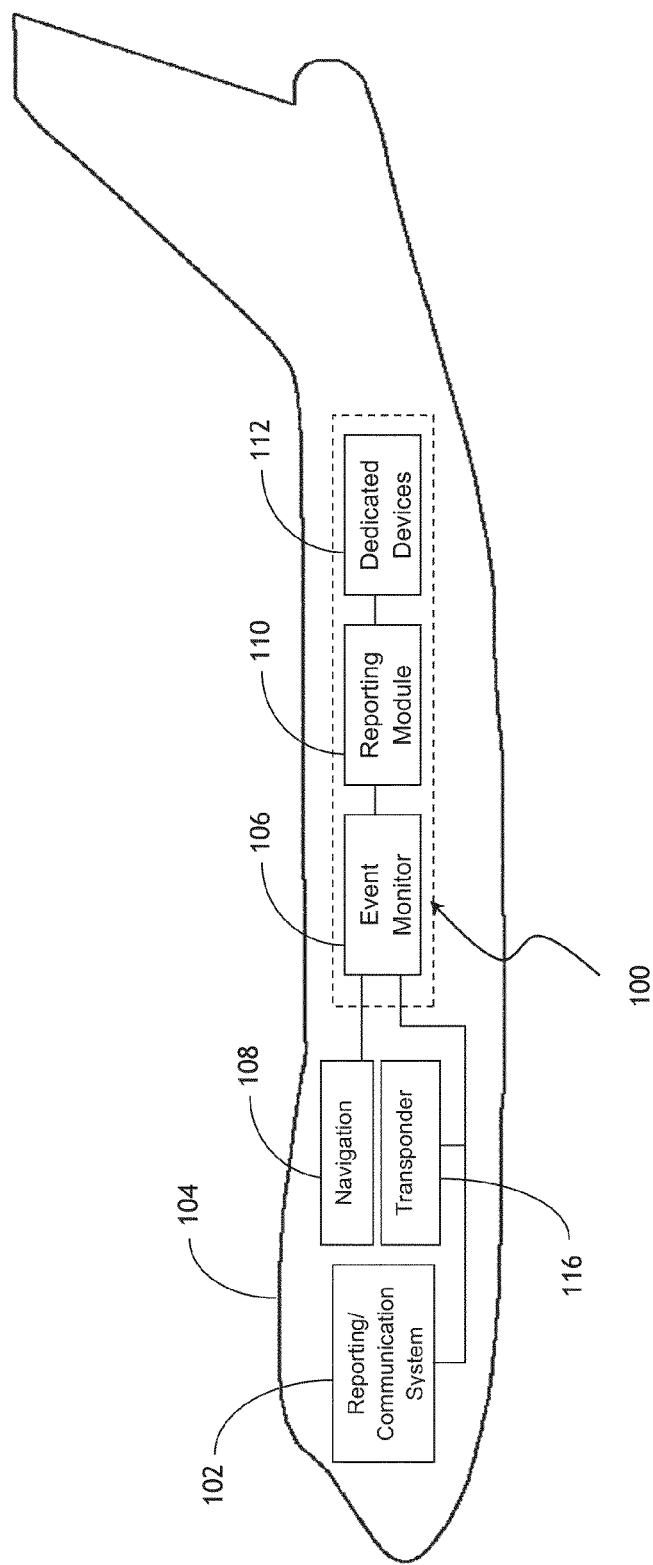
FIG. 1 is a block diagram depicting a supplemental reporting system.

Referring to FIG. 1, a block diagram depicting a supplemental reporting system 100 along with a main reporting system 102 is shown. In the context of aviation, a system such as the Aircraft Communications Addressing and Reporting System (AGARS) or the like may be utilized as the main reporting system 102 onboard the aircraft 104. The AGARS is a digital datalink system for transmission of messages between aircraft and ground stations via airband radio or satellite. It is understood, however, that the vehicle 104 may utilize other types of reporting/communication systems without departing from the spirit and scope of the present disclosure.

The supplemental reporting system 100 in accordance with one embodiment of the present disclosure includes an event monitor 106. The event monitor 106 is configured to monitor the operating condition of the main reporting system 102. The event monitor 106 may also be configured to monitor operating conditions of other systems/devices onboard the aircraft 104, including, but not limited to, navigation systems 108, transponder systems 116, positioning systems (e.g., global positioning system), flight management systems, data recording systems and the like. It is contemplated that the event monitor 106 may also be in communication with available tracking and surveillance systems. For example, if surveillance technologies such as Automatic Dependent Surveillance-Broadcast (ADS-B) or Automatic Dependent Surveillance-Contract (ADS-C) are available, and if ADS-B and/or ADS-C detect that a transponder onboard the aircraft 104 is not present or is unresponsive, the event monitor 106 may be notified.

When the event monitor 106 determines that a triggering event has occurred, the event monitor 106 automatically activates the reporting module 110 of the supplemental reporting system 100. The triggering events in accordance with the present disclosure may include various operating conditions that may suggest one or more systems/devices being monitored is not operating in a normal manner. For example, if a system (e.g., the transponder 116, the main reporting system 102, the navigation system 108 or the like) is experiencing some degree of failure, this system may be operating in a subnormal manner. In another example, if a system is experiencing a complete failure, unresponsive, or otherwise disabled (e.g., a power failure or a hostile situation), this system may not be operational at all. Therefore, when the event monitor 106 detects a subnormal or a hostile condition, it is configured to automatically activate the reporting module 110 in order to provide supplemental reporting, as the main reporting system may have been compromised.

It is understood that other types of detectable events may also be considered as triggering events in addition to the examples provided above. For instance, if a system being monitored by the event monitor 106 is inactive for more than a predetermined amount of time, a triggering event may be signaled. In addition, the event monitor 106 may utilize various types of sensors to monitor the power conditions, cabin/air pressure changes or the like. The event monitor 106 may signal a triggering event if a dramatic change is detected. It is contemplated that additional sensors may also be utilized to determine if an abnormal operating condition is occurring and if the reporting module 110 should be activated.

Upon activation, the reporting module 110 is configured to send out information that includes at least the position report. This supplemental position report may be sent to any Air Navigation Service Provider (ANSP) within communication. That is, the reporting module 110 may try to establish communication using any available communication channels, including, but not limited to, radio communication channels (e.g., high frequency, very high frequency), satellite communication channels (e.g., SATCOM), internet communication channels (e.g., WiFi), cellular communication channels as well as any other available communication channels. The reporting module 110 may also establish a periodic position report contract with ADS-C utilizing data from the flight management system and transponder. This will engage the ADS-C system to send a periodic position report to air traffic controllers worldwide.

It is contemplated that the reporting module 110 may also be configured to provide information in addition to the position report. For instance, in one exemplary embodiment where the AGARS is utilized as the main reporting system, the reporting module 110 may be configured to implement an AGARS that is independent from the main AGARS 102. The reporting module 110 may be further configured to provide separate ADS-C and controller-pilot data link communications (CPDLC) functions. In one embodiment, when the event monitor detects the event that aircraft main position reporting and/or communication system is disabled whether intentionally or unintentionally, the reporting module 110 is activated to first send aircraft position and other flight critical data using ADS-B. Subsequently, the reporting module 110 sends an Aeronautical Facilities Notification (AFN)/Context management (CM) logon request to list of ANSPs with current aircraft position data automatically. This process may utilize all available communication channels, such as radio communication channels, satellite communication channels, internet communication channels, cellular communication channels as well as any other available communication channels. The reporting module 110 may also automatically generate and downlink/transmit AGARS message containing position and other aircraft pertinent data such as aircraft state, time when the main system was disabled, altitude, speed, fuel and the like. Once the AFN/CM logon is completed, this will provide ANSPs a capability to request and retrieve various aircraft parameter using ADS-C such as position reports. The reporting module 110 can be configured to accept request from any ANSPs and provides the aircraft position and other flight information data.

It is contemplated that the AGARS provided by the reporting module 110 may include a subset of the functionalities provided by the main AGARS 102, but sufficient enough to serve as a backup AGARS if the main AGARS 102 is turned off or disabled. In one embodiment, once the event monitor 106 determines that the main AGARS 102 is turned off or disabled, the backup AGARS provided by the reporting module 110 may be turned on after a predetermined amount of time (e.g., a few minutes). As described above, this backup AGARS may start downlinking waypoint reporting to all datalink service providers that are within range of the aircraft utilizing any available communication channels. The backup AGARS may also attempt to reengage the transponder system to broadcast emergency position report. In addition, the reporting module 110 may also be configured to establish emergency ADS-C contracts and downlinking emergency reports. Furthermore, the reporting module 110 may be configured to enable to send emergency CPDLC report data, and ADS-B data, if it is determined that the navigation system 108, the transponder 116 and the data link have all been disabled or otherwise unresponsive.

It is also contemplated that the supplemental reporting system 100 may include one or more dedicated support devices/subsystems 112 such as an antenna, a positioning device, a power source, a battery or the like. The positioning device does not need to provide the same level of accuracy as the main navigation system 108, but it operates independently and is able to provide sufficient information to locate the aircraft 104. Providing dedicated support devices 112 as such allows the supplemental reporting system 100 to be self-contained and able to operate independently from the rest of the systems, which may be appreciated in a hostile situation, for example, when the rest of the systems have been disabled.

Furthermore, it is contemplated that the reporting system 100 may be configured as a dedicated apparatus that will be activated when it detects other systems that provide similar data are disabled. For example, the reporting system 100 may include a dedicated global positions system that can provide position data in the event that other positioning devices are turned off. In another example, the reporting system 100 includes a dedicated antenna and other subsystems to provide a means to downlink position data. Such a dedicated antenna allows the reporting system 100 to be self-contained and operate independently. It is contemplated that the reporting system 100 may be implemented as a single integrated device (e.g., an antenna with event detection circuitry) without departing from the scope and spirit of the present disclosure.

It is further contemplated that the supplemental reporting system 100 may be configured so that it cannot be turned off or disabled. For instance, no control interface to the supplemental reporting system 100 needs to be provided on the flight deck or elsewhere that is readily accessible to the pilot. Rather, the supplemental reporting system 100 can be configured as a small, self-contained and fully automated apparatus that monitors the other systems on a continuous basis and activates its reporting module when it detects a triggering event. In addition, the supplemental reporting system 100 may be configured to operate similar to a flight data recorder and it will broadcast as long as it has battery life.

It is also contemplated that the reporting systems described above do not require significant changes to the current architecture of the aircraft and are only intended to provide position information upon detection of certain events. Such a reporting system is minimally invasive, inexpensive, and can be installed on the aircraft in a non-interference manner.

Figure 2:
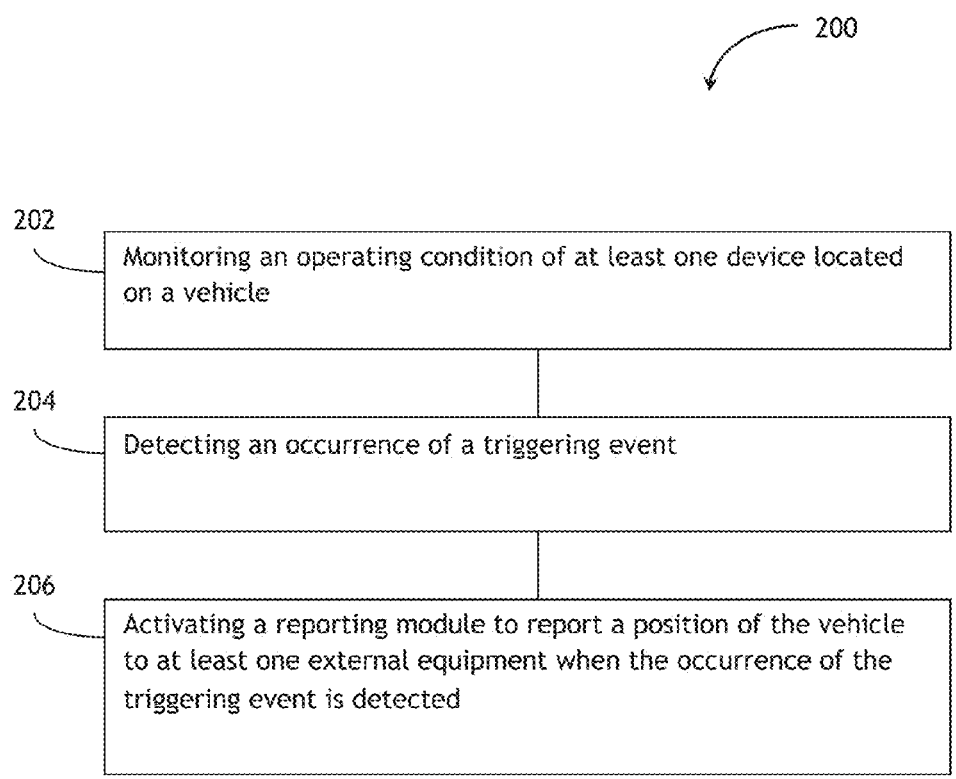
FIG. 2 is a flow diagram depicting a method for providing event driven vehicle position reporting.

Referring now to FIG. 2, a flow diagram depicting a method 200 for providing event driven vehicle position reporting is shown. Operating conditions of one or more systems/devices onboard the vehicle is being monitored in step 202. The systems/devices being monitored may include, but are not limited to, a reporting/communication system, a transponder system, a positioning system, a flight management system, a data recording system and the like. When a subnormal or a hostile operating condition is detected, a triggering event is signaled in step 204 and appropriate actions need to be taken. As previously described, operating conditions that may trigger the event signal may include, for example, if the communication system or the transponder system is turned off, unresponsive or otherwise disabled. Other conditions such as power outages or the like may also trigger the event signal.

Once a triggering event is signaled, a device onboard the vehicle is activated in step 206 and starts to report the position of the vehicle. In one embodiment, a supplemental reporting module is activated and starts seeking all ANSPs and air traffic control ground communication providers. Once a list of available ANSPs and/or ground communication providers is compiled, the supplemental reporting module starts sending down position data and position reports in any form/method accepted by the list of ground stations. The supplemental reporting module may also send position reports utilizing any or all available communication channels to any or all equipment within its range, including nearby vehicles, satellites, network access points or the like. Additionally and/or alternatively, the supplemental reporting module may implement a backup system to the main reporting system normally utilized by the vehicle. It is contemplated that this reporting method will help locate the vehicle, especially when the other systems onboard the vehicle are turned off, disabled, or failed to operate.

It is contemplated that while the examples above depicted an aircraft as an exemplary vehicle, such a depiction is merely utilized for illustrative purposes. The methods and systems for providing vehicle position reporting in accordance with the present disclosure are applicable to various types of vehicles, including aerial vehicles, maritime vehicles, ground based vehicles and the like. It is also contemplated that the position report referenced in the present disclosure may include various information related to the position data, including, but not limited to, altitude, latitude, longitude, speed, timing and other related data about the vehicle.

It is further contemplated that information including the type of failure detected, the duration of the failure and the like may also be reported. Information regarding when the transponder was turned off may also be recorded and included in the downlink. In addition, the detected events may be reported to flight operations automatically. In this manner, the flight operations of the airline will know the event(s) occurred and take necessary actions if needed.

It is to be understood that the present disclosure may be conveniently implemented in forms of a software/firmware/hardware package. Such a software/firmware/hardware package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the present disclosure is not limited to any underlying implementing technology. The present disclosure may be implemented utilizing any combination of software and hardware technology. The present disclosure may be implemented using a variety of technologies without departing from the scope and spirit of the disclosure or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

It is believed that the present disclosure and many of its attendant advantages will be understood by the foregoing description, and it will be apparent that various changes may be made in the form, construction, and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. A vehicle position reporting system, comprising:
an event monitor, the event monitor configured to monitor an operating condition of at least one device located on the vehicle and to detect an occurrence of a triggering event based on the operating condition of said at least one device located on the vehicle; and
a reporting module, the reporting module configured to send a position report from the vehicle to at least one external equipment when the reporting module is activated,
wherein the event monitor and the reporting module are prevented from being disabled by a vehicle operator, and wherein the reporting module is activated by the event monitor when the occurrence of the triggering event is detected.

2. The vehicle position reporting system of claim 1, wherein the event monitor is configured to monitor the operating condition of at least one of: a transponder system, a positioning system, an aircraft communications addressing and reporting system and a navigation system located on the vehicle.

3. The vehicle position reporting system of claim 2, wherein the occurrence of the triggering event is detected when at least one of: the transponder system, the positioning system, the aircraft communications addressing and reporting system and the navigation system at least partially fails.

4. The vehicle position reporting system of claim 1, wherein the reporting module is further configured to implement at least one of: a backup aircraft communications addressing and reporting system, an automatic dependent surveillance system, and a controller-pilot data link communication system, and wherein said at least one of: the backup aircraft communications addressing and reporting system, the automatic dependent surveillance system, and the controller-pilot data link communication system is activated after lapse of a predetermined amount of time since the occurrence of the triggering event is detected.

5. The vehicle position reporting system of claim 1, further comprising:
at least one dedicated support device configured to support independent operations of the reporting module, wherein said at least one dedicated support device includes at least one of: an antenna, a positioning device, and a power source.

6. The vehicle position reporting system of claim 1, wherein the reporting module is configured to send the position report from the vehicle to the at least one external equipment via at least one of: a radio communication channel, a satellite communication channel, an internet communication channel, and a cellular communication channel.

7. The vehicle position reporting system of claim 1, wherein the reporting module is configured to establish a periodic position report contract utilizing an automatic dependent surveillance-contract cooperative surveillance technology.

8. A vehicle position reporting system, comprising:
an event monitor, the event monitor configured to monitor an operating condition of at least an aircraft communications addressing and reporting system located on the vehicle and to detect an occurrence of a triggering event based on the operating condition of the aircraft communications addressing and reporting system; and
a reporting module, the reporting module configured to send a position report from the vehicle to at least one external equipment when the reporting module is activated by the event monitor when the occurrence of the triggering event is detected, the reporting module further configured to implement a backup aircraft communications addressing and reporting system, the backup aircraft communications addressing and reporting system being activated after lapse of a predetermined amount of time since the occurrence of the triggering event is detected,
wherein the event monitor and the reporting module are prevented from being disabled by a vehicle operator.

9. The vehicle position reporting system of claim 8, wherein the event monitor is further configured to monitor the operating condition of at least one of: a transponder system, a positioning system, and a navigation system located on the vehicle.

10. The vehicle position reporting system of claim 9, wherein the occurrence of the triggering event is detected when at least one of: the transponder system, the positioning system, the aircraft communications addressing and reporting system and the navigation system at least partially fails.

11. The vehicle position reporting system of claim 8, further comprising:
at least one dedicated support device configured to support independent operations of the reporting module, wherein said at least one dedicated support device includes at least one of: an antenna, a positioning device, and a power source.

12. The vehicle position reporting system of claim 8, wherein the reporting module is configured to send the position report from the vehicle to the at least one external equipment via at least one of: a radio communication channel, a satellite communication channel, an internet communication channel, and a cellular communication channel.

13. The vehicle position reporting system of claim 8, wherein the reporting module is configured to establish a periodic position report contract utilizing an automatic dependent surveillance-contract cooperative surveillance technology.

14. An event driven vehicle position reporting method, the method comprising:
monitoring an operating condition of at least one device located on a vehicle;
detecting an occurrence of a triggering event based on the operating condition of said at least one device located on the vehicle;
activating a reporting module to report a position of the vehicle to at least one external equipment when the occurrence of the triggering event is detected; and
preventing a vehicle operator from disabling the monitoring step, the detecting step, and the activating step.

15. The method of claim 14, wherein the at least one device being monitored includes at least one of: a transponder system, a positioning system, an aircraft communications addressing and reporting system and a navigation system located on the vehicle.

16. The method of claim 15, wherein the occurrence of the triggering event is detected when at least one of: the transponder system, the positioning system, the aircraft communications addressing and reporting system and the navigation system at least partially fails.

17. The method of claim 14, wherein the reporting module is configured to report the position of the vehicle via at least one of: a radio communication channel, a satellite communication channel, a wireless internet communication channel, a cellular communication channel, a backup aircraft communications addressing and reporting system, an automatic dependent surveillance system, and a controller-pilot data link communication system.

18. The method of claim 14, wherein the reporting module is configured to establish a periodic position report contract utilizing an automatic dependent surveillance-contract cooperative surveillance technology.

* * * * *